United States Patent [19]

Ahrens et al.

[11] Patent Number: 4,863,881

[45] Date of Patent: Sep. 5, 1989

[54] SHOCK CONSOLIDATION OF CUBIC BORON NITRIDE WITH WHISKERS OF SILICON COMPOUNDS

[75] Inventors: Thomas J. Ahrens; Hua Tan, both of Pasadena, Calif.

[73] Assignee: California Institute of Technology, Pasadena, Calif.

[21] Appl. No.: 246,235

[22] Filed: Sep. 15, 1988

[51] Int. Cl.[4] ........................ C04B 35/58; C04B 35/56

[52] U.S. Cl. .......................................... 501/92; 501/95; 501/96; 501/97

[58] Field of Search ........................ 501/92, 95, 96, 97; 423/290

[56] References Cited

U.S. PATENT DOCUMENTS

| | | | |
|---|---|---|---|
| 4,443,420 | 4/1984 | Sato | 423/290 |
| 4,539,300 | 9/1985 | Coblenz | 501/98 |
| 4,543,345 | 9/1985 | Wec | 501/95 |
| 4,650,776 | 3/1987 | Cerceau et al. | 501/96 |
| 4,788,166 | 11/1988 | Araki et al. | 501/96 |

FOREIGN PATENT DOCUMENTS

| | | | |
|---|---|---|---|
| 0044543 | 3/1980 | Japan | 501/96 |
| 0061254 | 4/1983 | Japan | 501/96 |

*Primary Examiner*—William R. Dixon, Jr.
*Assistant Examiner*—Karl Group
*Attorney, Agent, or Firm*—Ashen Golant Martin & Seldon

[57] ABSTRACT

Cubic boron nitride (C—BN) powders admixed with silicon carbide whisker (SCW) or silicon nitride whisker (SKW) may be shock-compacted to pressures of about 17 to 24 GPa. Good consolidation is achieved with 4 to 8 μm particle size C—BN powder admixed with about 15 wt % SNW or about 20 to 25 wt % SCW. The mixture (26) is placed in a ring (24) mounted on a capsule (22) and is shock-compacted with a flyer (10) accelerated by a propellant gun. A sapphire plate (28) prevents penetration of metal particles into the sample during shock processing. Scanning electron microscopy (SEM) analysis demonstrate that SCW and SNW in the mixtures is highly deformed and indicates melt textures. Micro Vickers hardness values as high as 50 GPa have been obtained for consolidated C—BN and SNW mixtures. This compares to 21 GPa for single crystal $Al_2O_3$ and 120 GPa for diamond.

4 Claims, 2 Drawing Sheets

12
18
S.S.304
14
24
24
10
S.S.304
28
22
16
26

SHOCK CONSOLIDATION OF CUBIC BORON NITRIDE WITH WHISKERS OF SILICON COMPOUNDS

ORIGIN OF INVENTION

The U.S. Government has certain rights in this invention pursuant to Contract No. DMR83-15213, awarded by the National Science Foundation.

TECHNICAL FIELD

The present invention relates to composites comprising whiskers in a matrix, and, more particularly, to composites of whiskers of silicon-containing compounds in a matrix of cubic boron nitride and to shock methods of forming such composites.

BACKGROUND ART

Shock wave processing techniques of materials have received much attention because of their unique ability to synthesize and compact difficult-to-consolidate metallic and non-metallic powders, especially certain non-oxide ceramics such as boron nitride (BN), silicon carbide (SiC) and silicon nitride ($Si_3N_4$) Synthetic cubic boron nitride (C-BN) has a hardness of 66 to 75 GPa on the micro-Vickers scale, only second to diamond (120 GPa), and a very high compressive strength of 4.15 to 5.33 GPa. It is potentially a very useful material when fabricated into cutting tools. Moreover, as a structural material it could be used in high temperature-high pressure environments.

Silicon nitride and silicon carbide whiskers have tensile strengths (14 GPa and 21 GPa, respectively) higher than steel (13.3 GPa) and very stable at temperatures as high as 1400° C. in an oxygen-rich environment. It is desirable to consolidate cubic boron nitride with silicon carbide whisker (SCW) or silicon nitride whisker (SNW) to produce a composite which is both hard and tough.

Although shock wave consolidation of super hard materials has been studied since the 1950's, only modest progress in achieving complete consolidation has occurred.

A series of attempts have been made to consolidate cubic boron nitride powder, employing static high pressure and high temperature. Two dense polymorphs of BN can be produced directly from the low pressure phase, graphite-structured boron nitride (g-BN, density 2.29 g/cm$^3$). These are the zincblende structure (C-BN, density 3.487 g/cm$^3$) and wurtzite structure (W-BN, density 3.454 g/cm$^3$). The thermophysical and thermochemical properties of C-BN are similar to those of diamond. Both diamond and C-BN convert to the graphite structure at temperatures of $\approx$1700 K in vacuum. However, unlike diamond, C—BN remains stable up to about 1300° K. in the presence of oxygen. Complex phase transition relationships have been found to exist between different forms of BN under various shock loading conditions. A main problem in direct shock consolidation of C—BN without a binding material is that a fraction of the C—BN converts into an amorphous low density form due to the high temperatures in the post-shock release process from very high pressures.

Moreover, it appears that the high thermal conductivity of C—BN ($\approx$8 watt/cm deg, which has a value approximately twice that of pure copper) is another problem in its dynamic consolidation. This is because the surface layer of melted material, resulting from preferential energy deposition via friction and plastic deformation in grain surface, is quenched so rapidly via radiation and Fourier conduction into the grain interior, that substantial surface melting does not occur. As a result, particles become almost isothermal after shock passage.

DISCLOSURE OF INVENTION

In accordance with the invention, strong, well-consolidated cubic boron nitride ceramic mixed with silicon whisker materials can be obtained, by single shock wave consolidation techniques, at shock pressures of about 17 to 24 GPa. Optimum initial conditions for 4 to 8 $\mu$m particle size C—BN are obtained with an initial density of about 60 to about 71% crystal density; good consolidation is not obtained for initial densities outside this range. Good consolidation is found to depend on obtaining initially very homogeneous sample powders.

Although there is a notable lack of measured thermochemical properties at high temperature—high pressures for BN, $Si_3N_4$ and SiC, preliminary one-dimensional model calculations are useful in understanding the physics of shock wave consolidation of materials. Thermal diffusion process, however, plays a unique role in interparticle bonding. The relatively low thermal conductivity of silicon whisker materials appears to enhance the surface heating of C—BN particles; the high thermal diffusivity of C—BN, in turn, appears to cause rapid quenching of the whisker materials. SEM images demonstrate that bonding between C—BN and whiskers materials is very sound.

BEST MODES FOR CARRYING OUT THE INVENTION

Figure 1:
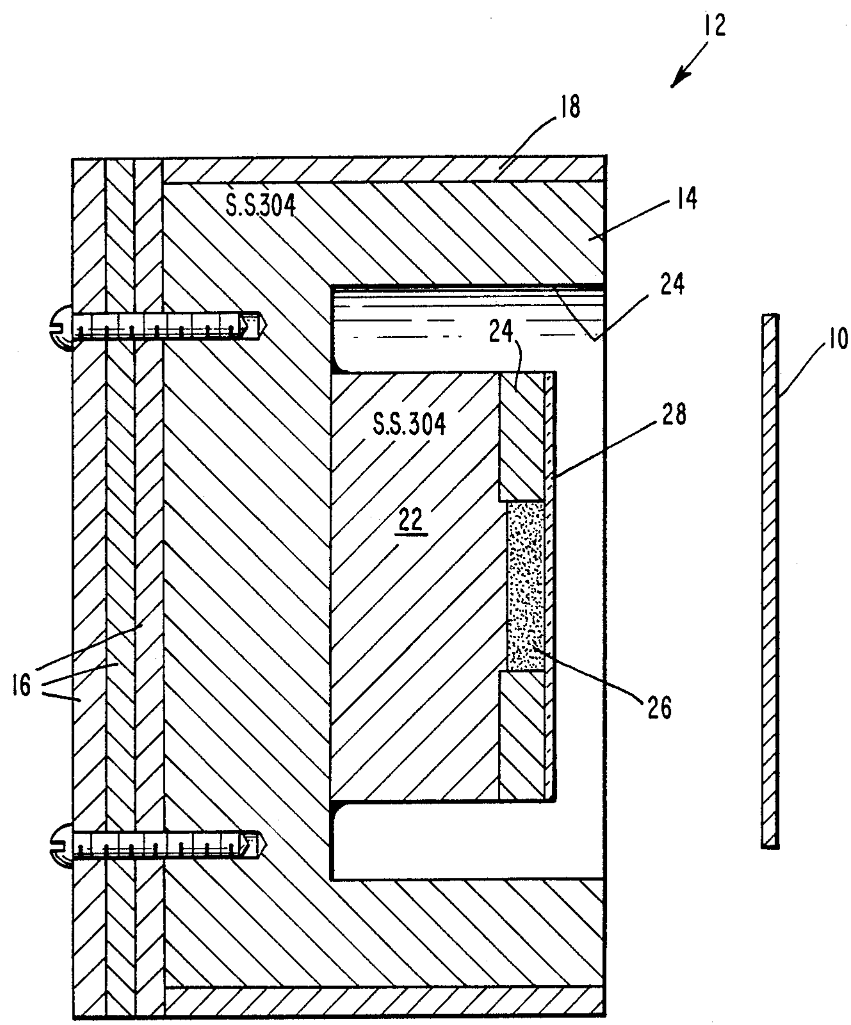
FIG. 1 is a cross-sectional view of apparatus suitable in the practice of the invention.

FIG. 1 depicts apparatus suitable for shock consolidation to form cubic boron nitride/silicon-containing whisker composites. A tantalum flyer 10, for example, 16 mm in diameter and 1.5 mm thick, is accelerated by a 20 mm propellant gun (not shown) to a velocity of about 1.9 to 2.0 km/sec, and impacted against a stainless steel 304, backed by a plurality of steel plates 16 and surrounded by an outer ring 18. The core 14 is provided with a cavity 20, in which is mounted a capsule 22, also of stainless steel 304. A ring 24 on one surface of the support 22 defines the sample chamber in which a powder sample 26 to be shock-compacted is placed. A sapphire plate 28 is placed between the sample 26 and the impact end of the capsule 22. This plate 28 prevents penetration of steel particles into the sample 26 during shock processing.

Starting materials used herein to form the compacts include C—BN powder (black): produced by General Electric Company, with nominal particle size of 37 to 44 $\mu$m and 4 to 8 $\mu$m, respectively. The initial crystal density of C—BN is 3.487 g/cm$^3$. SCW (pale green) and SNW (grey white), produced by Tateho Chemical Industries Co., are also employed. According to the manufacturer, both whiskers have an average length of 20 $\mu$m and diameter of 0.4 $\mu$m; SCW contains over 95 wt % $\beta$-SiC (cubic) and less than 5 wt % $\alpha$-SiC (hexagonal), the main impurity elements are Mg, Ca, Al, and Fe. The total content of impurities is less than 2 wt %. The SNW contains over 97 wt % $\alpha$-$Si_3N_4$ (trigonal) and less than 3 wt % B-$Si_3N_4$ (hexagonal). Its main impurities are similar to those in SCW but with totals of less than 1 wt %. The g-BN powder (white) is available from Aldrich Chemical Company, Inc. This product contains 99 wt % g-BN, with a nominal particle size of less than 1 $\mu$m, initial crystal density of g-BN is 2.290 g/cm$^3$ according to the manufacturer.

Samples are mixed in a porcelain mortar manually by stirring and grinding until an apparent uniform color was achieved. The mixture is then pressed into the stainless steel 304 capsule, to form a disc, for example, 5 mm in diameter and 2 mm thick. The sample disc is produced by alternatively placing and pressing powder materials into the capsule in three or four separate operations.

After impact, recovered capsules are machined-open. Post-shock analyses are conducted using SEM, x-ray diffraction analysis and micro-Vickers hardness tests.

Simple analysis of shock wave propagation in this experimental assembly indicates that typical two-dimensional flow is occurring. In the present experiments, most of the tantalum flyers 10 have a velocity of about 1.95 km/sec. According to one-dimensional model calculation typical shock wave velocities and shock pressures ($P_H$) are 6.5 km/sec and 57 GPa in the stainless steel and 5.4 km/sec and 22 GPa in the sample mixture, respectively. The mismatch between the capsule wall and sample will inevitably create a two-dimensional shock wave. The flyers 10 have a diameter of 16 mm, with the samples of 2 mm thick and 5 mm in diameter. Since the stainless steel target has a thickness of 2.5 mm, the shock wave front and the edge rarefaction wave front, after impaction, will reach the back outer corner of the sample at almost the same time. Thus, a very high pressure stress wave, propagating radially inward along the back side of the sample, when the shock wave in the capsule wall reaches the bottom side of the sample is not predicted to occur. It may be inferred that the one-dimensional calculations are thus approximately valid in yielding the correct shock pressure at the near-axis inner part of the sample.

Figure 2:
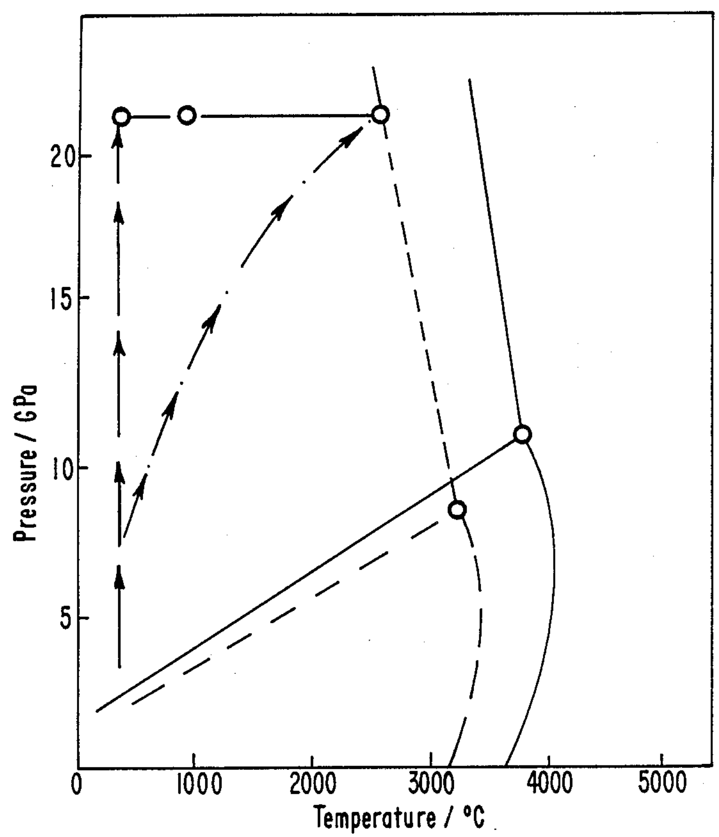
FIG. 2, on coordinates of pressure in GPa and Temperature in °C., depicts the phase relations for boron nitride and carbon at high temperature and pressure. Paths for shock temperatures and pressures at the particle center (C) and particle surface (S) which is assumed by a surface heating model, and the equilibrium temperature (E) which is reached through thermal diffusion process between the molten surface layer and relatively cool center area of particle, are shown. Arrows show the direction for the shock compression and thermal relaxation process.

Heat conduction between an assumed molten layer on the surface of each C—BN particle and the relatively cool interior will result in freezing, and hence, interparticle welding. FIG. 2 shows the interior temperature ($T_{ir}$), the surface temperature ($T_m$) and the continuum temperature ($T_H$) of C—BN particles reached by this assumed thermal relaxation process. This cooling process must occur rapidly enough such that the conduction time is less than the time that the shock compression pulse keeps the sample at high pressure. These then define a lower limit of the freezing time, $t_f$ $$t_f \leqq \frac{\pi D_m}{16}\left[\frac{L \cdot d \cdot H_m}{D_m \cdot p \cdot C_{p,m} \cdot (T_m - T_O)}\right]^2 \quad (1)$$

through particle diameter d, density p, specific heat $C_{p,m}$ and thermal diffusivity $D_m$, at the melting temperature and pressure.

C—BN and g—BN have thermal diffusivity values approximately equal to that of diamond ($1\times10^{-4}$ m$^2$/sec) and graphite ($1\times6^{-4}$ m$^2$/sec).

Larsen's value of thermal diffusivity for silicon-bearing ceramics may be employed. Taking into account the variation of thermal diffusivity with temperatures and pressures, this value is $5\times10^{-6}$ m$^2$/sec and $5\times10^{-7}$ m$^2$/sec for SCW and SNW, respectively.

Substantial consolidation can only be achieved if $t_f$ is considerably longer than the shock transition time, $t_r$, through one particle $$t_r = d/u_s \quad (2)$$

and, at the same time short enough relative to the time of shock duration, $t_d$ $$t_d \leqq t_h \quad (3)$$

where, $t_h$ represents the thermal equilibrium time $$t_h \approx d^2/D_m \quad (4)$$

A Cubic Boron Nitride (C—BN) plus Graphite Structure BN (g-BN)

Phase transition from g-BN to dense form of BN (wurtzite structure) is known to occur at shock pressure of about 12 GPa and is completed at pressures higher than 20 GPa. The relatively low thermal diffusivity of g—BN might favor the processes of surface heating of C—BN particles. On the other hand, the high thermal conductivity of C—BN might be able to hinder the reverse transition from C—BN, or W—BN, to g—BN during the post-shock release process.

The main results of shock consolidation of C—BN plus g—BN mixture are listed in Table 1. No consolidation was achieved for these mixtures. A friable, but not consolidated, recovery of pure C—BN (shot 943) was obtained. Calculations show that, by adding g—BN into C—BN upon shock compaction, a 0.1 $\mu$m layer of molten g—BN in the C—BN particle (d=6 $\mu$m) surface will increase the freezing time from 1 nsec to 60 nsec. It is likely that the existing g—BN powder in the initial mixture, because it becomes hotter (about 2200° K. in shot 935), will accelerate the reverse transition of C—BN to g—BN, or to amorphous low density form. A poorly consolidated sample from a recovery sample (shot 926) was obtained for the case where the mass fraction of g—BN is relatively small and the particle size difference between g—BN (<1 $\mu$m) and C—BN (37 to 44 $\mu$m) is too great to produce a uniform mixture. The actual mixture sample obtained in shot 926 contains more than 95 wt % C—BN as indicated by SEM observation.

TABLE 1

Shock Compaction of Cubic Boron Nitride Plus Graphite Structure BN

| Shot No. | C-BN Mass Fraction (%) C-BN | g-BN | Initial Particle Size (μm) | Crystal Density (%) | Flyer Velocity (Km/sec) | $P_H$ (GPa) | $T_H$ (K) C-BN | g-BN | Recovered Results |
|---|---|---|---|---|---|---|---|---|---|
| 926 | 90.9 | 9.1 | 37–44 | 70 | 1.90 | 20.3 | 804 | 2146 | Compacted, friable |
| 933 | 90.9 | 9.1 | 4–8 | 70 | 1.95 | 21.1 | 826 | 2219 | U/C |
| 935 | 85.7 | 14.3 | 4–8 | 70 | 1.94 | 20.0 | 713 | 2124 | U/C |
| 940 | 75 | 25 | 4–8 | 70 | 1.97 | 19.0 | 498 | 2019 | U/C |
| 943 | 100 | 0 | 4–8 | 71 | 2.03 | 24 | 1059 | | Compacted, friable |

Note: U/C = Unconsolidated

Typical infrequent interparticle fusion bonding explains the weak consolidation of pure C—BN (4 to 8 μm). Also, transparticle fracture is observed for large particle size of C—BN. X-ray diffraction pattern of pure C—BN (shot 943) and C—BN plus g—BN (shot 935) recovery samples shows that the reverse transition to an amorphous phase, mentioned above, apparently occurred.

B. Cubic Boron Nitride (C—BN) plus Silicon Nitride Whisker (SNW)

Table 2 summarizes the main results for C—BN plus SNW experiments. Well-consolidated samples were obtained upon shocking 70% crystal density mixture of 85 wt % C—BN (4 to 8 μm particle size) plus 15 wt % SNW to 22 GPa. Model calculation shows that SNW reaches a continuum temperature higher than 1800° K., and fairly close to its melting temperature 2173° K. In contrast, assuming only surface melting, a melt mass fraction $\approx$50% is calculated. Both calculations appear to be consistent with results obtained. These demonstrate that the whiskers, either in solid or very plastic state close to their melting point, change their shape dramatically. This highly deformed behavior exhibited by SNW is apparently achieved via plastic deformation during the shock wave compaction process. The whisker materials appear to be bonding the sample together soundly.

TABLE 2

Shock Compaction of Cubic Boron Nitride Plus Silicon Nitride Whisker

| Shot No. | C-BN Mass Fraction (%) C-BN | SNW | Initial Particle Size (μm) | Crystal Density (%) | Flyer Velocity (Km/sec) | $P_H$ (GPa) | $T_H$ (K) C-BN | SNW | Recovered Results |
|---|---|---|---|---|---|---|---|---|---|
| 929 | 90.9 | 9.1 | 37–44 | 70 | 2.01 | 23.4 | 1020 | 1992 | Compacted |
| 932 | 85 | 15 | 4–8 | 60 | 1.95 | 17.8 | 1154 | 2081 | Consolid. |
| 936 | 85 | 15 | 4–8 | 71 | 1.94 | 22.5 | 929 | 1876 | Consolid. |

Model calculation for C—BN yields only about 9% melt mass fraction from Eq. (1), or, a continuum temperature about 1000° K., less than one-third of its melting temperature 3273° K. The very small compression ($\approx$2.30%) in C—BN suggests that the shock temperature in the particle cores only reaches 400° K. or so (FIG. 2). This implies that the strong interparticle bonding can only be achieved via the thin layer melting—freezing process of surface materials assumed by Eq. (1).

Since both the freezing time and shock transit time through one particle is about 1 nsec, this time is too short to produce any significant melting and bonding. The situation changes, however, if a thin layer of molten SNW material, say 0.2 μm, exists. This molten layer of SNW will increase the freezing time to $\approx$70 nsec due to its lower thermal diffusivity ($5\times10^7$ m²/sec). This allows sufficient time (relative shock transit time) to yield more surface melting and particle deformation so that inter-particle bonding will occur.

The small particle size reduction from SEM and the lattice strain, estimated from the x-ray line broadening for BN (about 0.3% for shot 936) suggests that plastic deformation occurred during shock compression. However, the energy consumed in this plastic deformation is only 0.15% of the total shock energy. Hence, most shock compression energy is consumed in the shock heating of particles.

In comparison with pure C—BN compaction and C—BN plus g—BN compaction, interparticle bonding is much improved, especially in regions where C—BN particles are surrounded by whiskers. It is unclear whether a solid solution between BN and $Si_3N_4$ is formed. It is noted that the recovered sample of shot 929 (Table 2) is better consolidated than from shot 926 (Table 1) where g—BN is used instead of SNW. This suggests that the admixture of SNW benefits the shock consolidation of C—BN powder.

The recovered sample from shock 936 is quite hard, a sharp edge produced upon machining open the sample assembly easily scratched the hardened steel and single crystal $Al_2O_3$. Micro Vickers hardness test was carried using a 500 load and a value of 50±13 GPa was obtained. To increase the contrast required for visual observation of the indentation, the sample was polished to 1 μm finish and coated with gold prior to this hardness test.

No irreversible $\alpha$-$\beta$ phase transition in silicon nitride should in the present shock pressure range. This is confirmed by x-ray diffraction analysis. Also, no reversion to a low pressure phase upon x-ray diffraction analysis of the sample was observed.

C. Cubic Boron Nitride (C—BN) Plus Silicon Carbide Whisker (SCW)

A well-consolidated sample was recovered for a sample mixture consisting of 80 wt. % C—BN and 20 wt. % SCW, at initial density of 70% crystal density, and shocked to 22 GPa in (Table 3, shot 938). A less consolidated recovered sample resulted when the mass fraction of SCW increased to 25 wt. % (shot 939). Even less consolidation was achieved when this fraction decreased to 14 wt. % (shot 937). Qualitatively, decreasing the SCW content results in decreasing surface heating and less melt production from the C—BN. If too much SCW is added, too much heating results. The freezing time and thermal equilibrium time become too long for C—BN and whisker itself, and pressure release occurs before consolidation.

TABLE 3

Shock Compaction of Cubic Boron Nitride Plus Silicon Carbide Whisker

| Shot No. | C-BN Mass Fraction (%) C-BN | SCW | Initial Particle Size (μm) | Crystal Density (%) | Flyer Velocity (Km/sec) | $P_H$ (GPa) | $T_H$(K) C-BN | SCW | Recovered Results |
|---|---|---|---|---|---|---|---|---|---|
| 928 | 90.9 | 9.1 | 37–44 | 71 | 1.95 | 23.0 | 968 | 1937 | Uncom. |
| 937 | 85 | 15 | 4–8 | 71 | 2.01 | 23.7 | 963 | 1972 | Uncom. |
| 938 | 80 | 20 | 4–8 | 70 | 1.95 | 22.1 | 937 | 1834 | Consolid. |
| 939 | 75 | 25 | 4–8 | 71 | 1.97 | 22.6 | 895 | 1845 | Consolid. friable |

Note: Uncom. = Uncompacted

Typical SEM images from shot 938 demonstrate similar features as for C—BN admixed with SNW. Again, SCW appears deformed plastically and bonded with C—BN particles. Uniform texture and high degree of consolidation exists. C—BN particles surrounded by whisker materials are very well bonded together via surface fusion.

When contents of SCW whisker material are increased to 25 wt %. only weakly interparticle bonding was obtained and particles could be broken off from the recovered sample with a steel probe as indicated above. While that SCW whisker material was indeed melted during shock compaction, only poor compaction was obtained because of the non-uniform initial mixture.

One of the best recovered samples, shot 938, exhibits fairly high hardness, the sharp edge of the opened surface could also scratch hardened steel and single crystal $Al_2O_3$. After polishing and gold coating of this sample surface, a micro Vickers hardness of 34±14 GPa was observed, slightly lower than that of shot 936.

No irreversible phase transition from $\beta$ (cubic) to $\alpha$ (hexagonal) for silicon nitride was detected by x-ray diffraction.

INDUSTRIAL APPLICABILITY

Composites of cubic boron nitride and silicon carbide or silicon nitride whiskers may find use in applications requiring hard materials, such as abrasives.

Thus, there has been disclosed a process for fabricating composites of cubic boron nitride and silicon carbide or silicon nitride whiskers. It will be clear to one of ordinary skill in this art that various changes and modifications of an obvious nature may be made, and all such changes and modifications are considered to fall within the scope of the invention, as defined by the appended claims.

What is claimed is:

1. A composite consisting essentially of a matrix of cubic boron nitride and a plurality of whiskers of silicon-containing materials selected from the group consisting of silicon nitride and silicon carbide.

2. The composite of claim 1 wherein said composite comprises essentially of about 15 wt % silicon nitride and the balance cubic boron nitride.

3. The composite of claim 1 wherein said composite consists essentially of about 15 wt % silicon nitride and the balance cubic boron nitride.

4. The composite of claim 1 wherein said cubic boron nitride has a particle size ranging from about 4 to 8 μm.

* * * * *